US006964152B2

(12) United States Patent
de Groot (10) Patent No.: US 6,964,152 B2
(45) Date of Patent: Nov. 15, 2005

(54) LEAFY VEGETABLE HARVESTER AND METHOD

(75) Inventor: Peter de Groot, Carmel, CA (US)

(73) Assignee: SECO Packing, Salinas, CA (US)

( * ) Notice: Subject to any disclaimer, the term of this patent is extended or adjusted under 35 U.S.C. 154(b) by 0 days.

(21) Appl. No.: 10/271,291

(22) Filed: Oct. 15, 2002

(65) Prior Publication Data

US 2003/0079453 A1 May 1, 2003

Related U.S. Application Data

(63) Continuation of application No. 09/478,918, filed on Jan. 6, 2000, now Pat. No. 6,463,722.

(51) Int. Cl.[7] ............................................. A01D 45/00
(52) U.S. Cl. ..................................................... 56/327.1
(58) Field of Search ................................ 56/12.8, 12.9, 56/13.1, 13.2, 13.3, 13.6, 14.3, 16.5, 327.1, 328.1, DIG. 2, DIG. 8

(56) References Cited

U.S. PATENT DOCUMENTS

| 2,791,878 | A |   | 5/1957  | Kepner |
|-----------|---|---|---------|--------|
| 3,722,193 | A |   | 3/1973  | Strubbe |
| 3,753,736 | A |   | 8/1973  | Barker |
| 4,009,556 | A |   | 3/1977  | Molzahn |
| 4,257,218 | A |   | 3/1981  | McRobert |
| 4,288,970 | A | * | 9/1981  | Wilde ........................ 56/327.2 |
| 4,353,201 | A | * | 10/1982 | Pierce et al. ................... 56/364 |
| 4,573,308 | A |   | 3/1986  | Ehrecke et al. |
| 4,629,005 | A |   | 12/1986 | Hood, Jr. et al. |
| 4,662,162 | A |   | 5/1987  | Bettencourt et al. |
| 4,918,909 | A |   | 4/1990  | Salkeld |
| 4,967,545 | A | * | 11/1990 | Fischer et al. ................ 56/12.9 |
| 5,327,709 | A |   | 7/1994  | Webb |
| 5,795,223 | A |   | 8/1998  | Spiesberger et al. |
| RE35,917  | E |   | 10/1998 | Fischer et al. |

OTHER PUBLICATIONS

Photocopy of a photograph showing an italian made lawn mower including a bandsaw cutter (1999).
Advertising flyer for Self Propelled Harvester (Machines Simon), 1 p. no date.
5 photographs of Harvester (Machines Simon), 2 pages no date.
Sales flyer and spec's for Ortomec Harvester, 3 pages no date.
Sales materials for Agromatica Harvester, 4 pages no date.

* cited by examiner

*Primary Examiner*—Robert E Pezzuto
(74) *Attorney, Agent, or Firm*—Gregory Scott Smith; GSS Law Group (57) ABSTRACT

The invention is a harvester particularly suited for harvesting baby greens. The harvester generally comprises a chassis with wheels that travel in the furrows between raised beds, a sorting belt assembly, and an articulated connection to a cutting assembly on a floating header. The floating header rides on the top surface of a raised bed and is articulated so that the floating header can move independently of the chassis to follow the contours of the top of the raised bed so that the cutting assembly can cut at a uniform height. The sorting belt assembly includes a series of belts for collecting and sorting the cut baby greens at the easiest and most effective time to do so, immediately after the baby greens are cut and before the baby greens are clumped in storage bins or in other storage container. The invention further includes a method of using the harvester of the invention in which the forward momentum of harvester and the density of the crop are used to assist the cut product onto the collection belt.

19 Claims, 8 Drawing Sheets

LEAFY VEGETABLE HARVESTER AND METHOD

CROSS REFERENCE TO OTHER APPLICATIONS

This application is a continuation application of utility patent application Ser. No. 09/478,918 filed Jan. 6, 2000, now U.S. Pat. No. 6,463,722.

FIELD OF THE INVENTION

This invention relates generally to a harvesting apparatus and more specifically to a self-propelled harvester especially suited for harvesting small leafy vegetables including but not limited to baby spinach and lettuce type greens.

BACKGROUND OF THE INVENTION

A wide variety of lettuce-type greens including baby leaf spinach, tango, lolla roas, red oak leaf, baby romaine, green oak leaf, baby red romaine, baby red chard, red mustard, Totsoi, Mizuma, Frisee, arruagula, radicchio, and curly endives are currently grown, and are typically referred to in the trade under the term "baby greens." They are harvested well before maturity for freshness and tenderness. Baby greens are typically used for mixed or one of a kind salads and garnishes in restaurants and in pre-packaged bags available at grocery stores. Shelf life is critical to the greens market. It takes a significant amount of time after harvest for the greens to pass through processing and distribution to market. Greens crush and bruise easily, and subsequently wilt and discolor to brown within a matter of hours. Wilted and bruised greens leaves are undesireable. Therefore, great care must be taken in handling the greens through the entire process of harvesting and moving the product from the field to the market. To minimize damage during harvesting, greens must be severed without pulling, tearing or shredding, and must be handled gently as they are transported from the field.

Currently, growers are using both manual harvesting and machine harvesting of baby greens. Each of the prior harvesting means has disadvantages. Manual harvesting of baby greens requires many farm laborers to enter the fields and kneel or lean across the bed to sever the stems of the baby greens adjacent to the earth with a knife or sickle. The laborer then places the severed greens by hand into carrying boxes called totes, which are stacked in pallets for transportation. Manual harvesting has a number of significant disadvantages. Firstly, the cost of the numerous laborers is high. Second, the low height of the baby greens means that when the top is gripped by the worker, the worker must cut fairly close to his or her hand, and as a result, many workers are injured in the fields. Third, hand harvesting necessarily limits the width of the beds to 36 to 48 inches between furrows, which is a width reachable by the workers. Narrower furrows have the adverse effect of reducing the yield per acre of product from the yield that could be obtained with wider furrows. Fourth, the harvest period for hand harvesting is typically from 6:00 am to 10:00 am in the morning, before which it may be too dark for the workers to work safely, and after which the whether may be too hot as the cut greens will wilt too fast. Thus in a typical 3–4 hour cutting day, a working can produce only about 15 totes. Lastly, it is not possible to get an accurate and uniform even cut at a specified height when harvesting by hand.

A number of self-propelled harvesters have been developed to harvest baby greens. These harvesters overcome some of the problems encountered in harvesting by hand, however, a number of other problems have been encountered. For example, Prior art harvesters have been complicated and expensive to purchase and maintain some prior art harvesters are extremely heavy vehicles. Furthermore, the high weight of such harvesters can disrupt the structure of the furrows, possibly requiring that the field be replowed after each harvest. The high weight and size of these harvesters can make the prior harvesters difficult to transport from field to field. Lastly, the cutting and collecting methods used by prior harvesters frequently results in damage to the delicate baby greens.

Whether the baby greens are harvested by hand or by machine, it is preferred that the harvested baby greens consist mostly of whole leaves, and that smaller pieces and cotyledon leaves be discarded. Sorting baby greens is difficult after the leaves have been harvested and placed in totes or other storage containers because the leaves tend to clump together.

What is needed is a harvester that is lightweight, inexpensive to maintain, and that will harvest the greens in a manner optimal to retaining freshness and shelf life, and that can sort the cut greens in the field to remove unwanted material before the product becomes bunched in storage containers.

SUMMARY OF THE INVENTION

Accordingly, the present invention is a harvester that is particularly suited for harvesting baby greens. The harvester includes a chassis and a floating header that can move independently of the chassis to follow the contours of the top of a raised bed. The floating header includes a header frame supporting a cutting assembly, and a ground contact assembly that runs on the top surface of the raised bed and supports the weight of the floating header. In the preferred embodiment the cutting assembly comprises a band saw with a band saw blade having a knife edge rather than toothed edge. An articulated coupling assembly couples the chassis and the floating header to allow the floating header to move vertically relative to the chassis, and to rotate perpendicular to a front to back axis of the chassis, or roughly perpendicular to the plane of the surface of the top of the raised bed.

One advantage of the invention is that it can sort the cut baby greens at the easiest and most effective time to do so, immediately after the baby greens are cut and before the baby greens are clumped in storage bins or other storage means. The invention includes at least one sorting belt, and preferably two sorting belts, with apertures of a selected size to accept the cut greens from the cutting assembly. The cutting assembly preferably provides a relatively even flow, at a relatively constant rate, of a single layer of leaves to the sorting assembly. In a preferred embodiment, a collection belt catches the greens cut by the cutting assembly and transfers the greens to the first sorting belt, and the second sorting belt accepts the cut greens from the first sorting belt. The first sorting belt travels at a rate approximately twice the speed of the collection belt, and the second sorting belt travels at approximately 1.5 times the speed of the collection belt. The sorting belt frame is pivotally coupled to the chassis of the harvester so that the forward end of the sorting frame can pivot up and down relative to the chassis, and also somewhat forward and back relative to the chassis, in order to follow the floating header.

In one embodiment, the articulated coupling includes four linking arms extending between a superstructure of the chassis and the header frame. The articulated coupling further includes an additional linking arm coupled to the forward end of the sorting belt frame between the header frame and the sorting belt frame. In one embodiment, the ground contact assembly includes a single ground contact roller. In an another embodiment, the ground contact assembly comprises a plurality of ground contact rollers. In yet another embodiment, the ground contact assembly comprises a belt assembly including at least one ground contact belt around at least two rollers. In a preferred embodiment, the harvester further includes a suspension system for reducing the ground pressure applied by the ground contact assembly. A preferred embodiment of the suspension system comprises at least one lift arm pivotally coupled at a first end to the chassis, and at least one spring element coupled between the lift arm and the header frame. Thus, when the lift arm pivots up, the tension on the spring increases, thereby reducing the weight applied to the surface of the raised bed by the ground contact assembly.

The invention also comprehends a method of harvesting leafy green vegetables such as baby greens, the method steps comprising: (a) providing a field planted with a selected crop density, (b) providing a harvester suitable for harvesting leafy green vegetables (c) using the forward momentum of harvester and crop density to assist the cut greens to be collected in the collection means. The method may further include the step: (d) using sorting belts on the harvester to sort the cut greens immediately after the greens are cut while the greens are transported to the storage containers.

DETAILED DESCRIPTION OF THE INVENTION

Although the harvester of the invention may be useful for harvesting a variety of kinds of produce, it is particularly suited for harvesting baby greens. The harvester generally comprises a chassis with wheels that travel in the furrows between raised beds, a floating header, that includes a cutting assembly, coupled to the chassis, and a series of belts for collecting and sorting the cut baby greens. The harvester is designed to efficiently cut the vegetables to be harvested, yet also to be lightweight, simple, dependable, inexpensive, and maneuverable.

In general, the invention comprises a floating header, including a cutting assembly, that rides on the top surface of a raised bed and that is articulated so that the floating header can move independently of the chassis to follow the contours of the top of the raised bed in order to cut the baby greens to be harvested at a relatively uniform height above the surface of a raised bed on which the greens are grown. The invention also comprises a sorting assembly to sort the cut baby greens at the easiest and most effective time to do so, immediately after the baby greens are cut and before the baby greens are clumped in storage bins or other storage means. The invention further includes a method of using the harvester of the invention in which the forward momentum of harvester and the density of the crop are used to assist the cut greens onto the collection belt.

Figure 1:
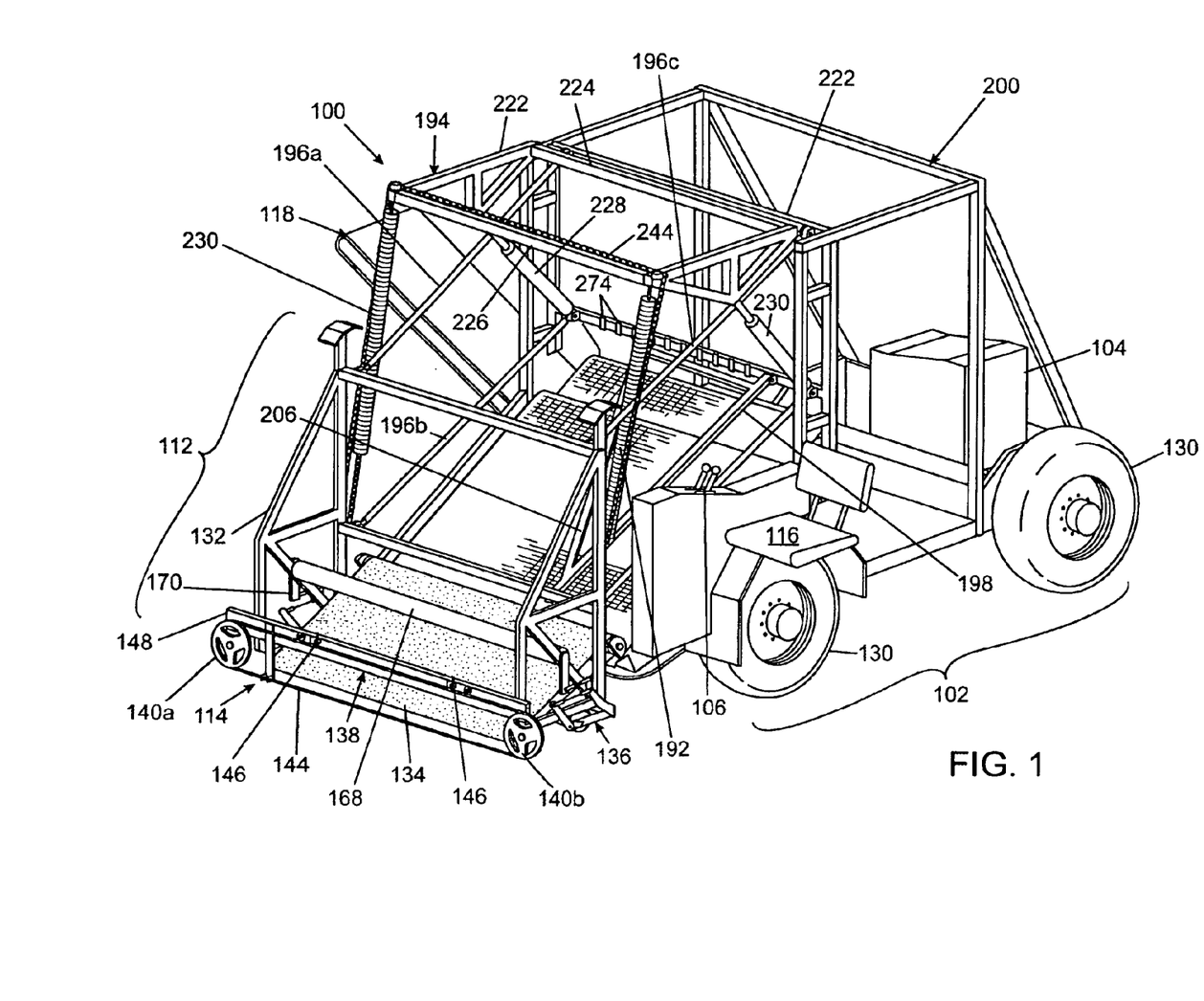
FIG. 1 shows a perspective view of an embodiment of the harvester of the invention.

Further description of the invention will now be made with reference to the FIGS. 1 through 8, which generally disclose the best mode of the invention optimized for harvesting baby greens. FIG. 1 shows a perspective view of a first embodiment of the harvester 100 of the invention, including a four wheeled self propelled chassis 102 including a power source 104, a sorting belt assembly 108, best seen in FIG. 8, to sort and deliver the cut baby greens 110 to totes 120 on a conveyor system 118 for further transporting and lifting the cut greens 110 to a truck or trailer or other temporary storage. The harvester 100 further includes a floating header 112, with a cutting assembly 114, coupled to the front of the chassis 102. The preferred embodiment also includes a driver's seat 116 and steering controls 106, and worker stations for one or more sorters and tote handlers to stand or sit on the harvester 100. Any practical power source 104 may be used to run the harvester 100, however, commercially available diesel engines capable producing a peak output of about 39 horse power have been found acceptable. The harvester 100 preferably uses hydraulically driven wheels, thus, the power source 104 can be positioned in any convenient location as the harvester 100. In alternate embodiments, the harvester 100 can be adapted to use electric power, or other fuels such as alcohol, gasohol, or propane.

Figure 2:
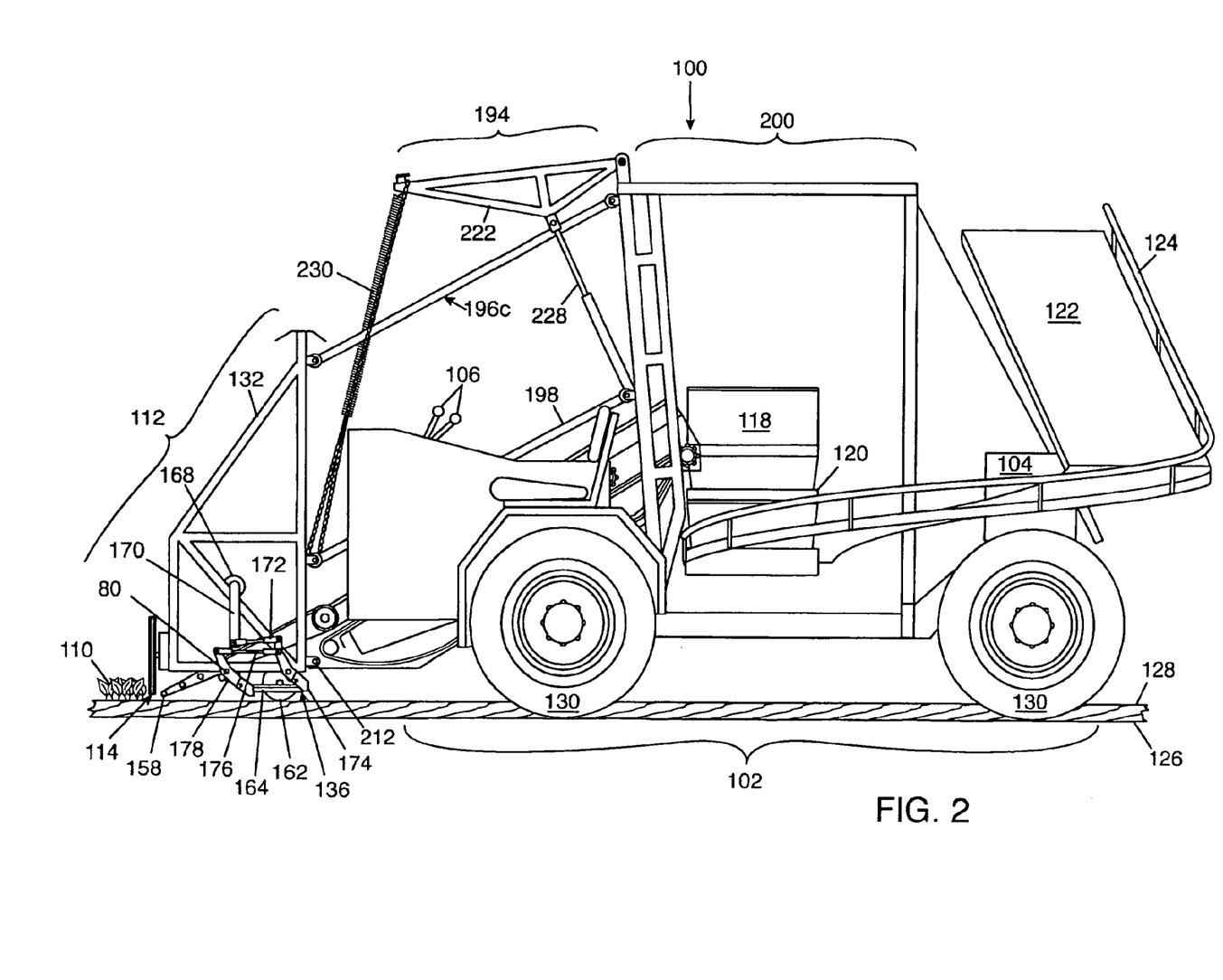
FIG. 2 shows a side view of an embodiment of the harvester.

FIG. 2 shows a side view of the harvester 100 in which the tote 120 that catches the sorted greens 110 is more clearly visible. Also, a slide 122 is visible in FIG. 2 that is used to deliver empty totes 120 to the conveyer assembly 118. The slide 122 includes at least an outside rail 124 to prevent the totes 120 from falling from the slide 122. In alternate embodiments, the harvester may not include a slide 122, or alternatively some other useful configuration of the slide 122 may be used. The harvester 100 is shown in position for operation in a filed with the wheels 130 in furrows 126 on either side of the raised bed 128. The floating header 112 is positioned with the ground contact assembly 136 on the raised bed 128, and the cutting assembly 114 in position for harvesting.

The harvester 100 is generally constructed of tubular and rectangular carbon steel beams and steel sheets. The overall design of the harvester 100 is intended to maximize the function of the harvester 100 while also keeping the weight of the harvester 100 as low as possible. The total weight of the harvester 100 is preferably between 3,500 pounds and 5,000 pounds, depending on the number of people in the crew, and on what optional features have been installed on the harvester 100.

Figure 3:
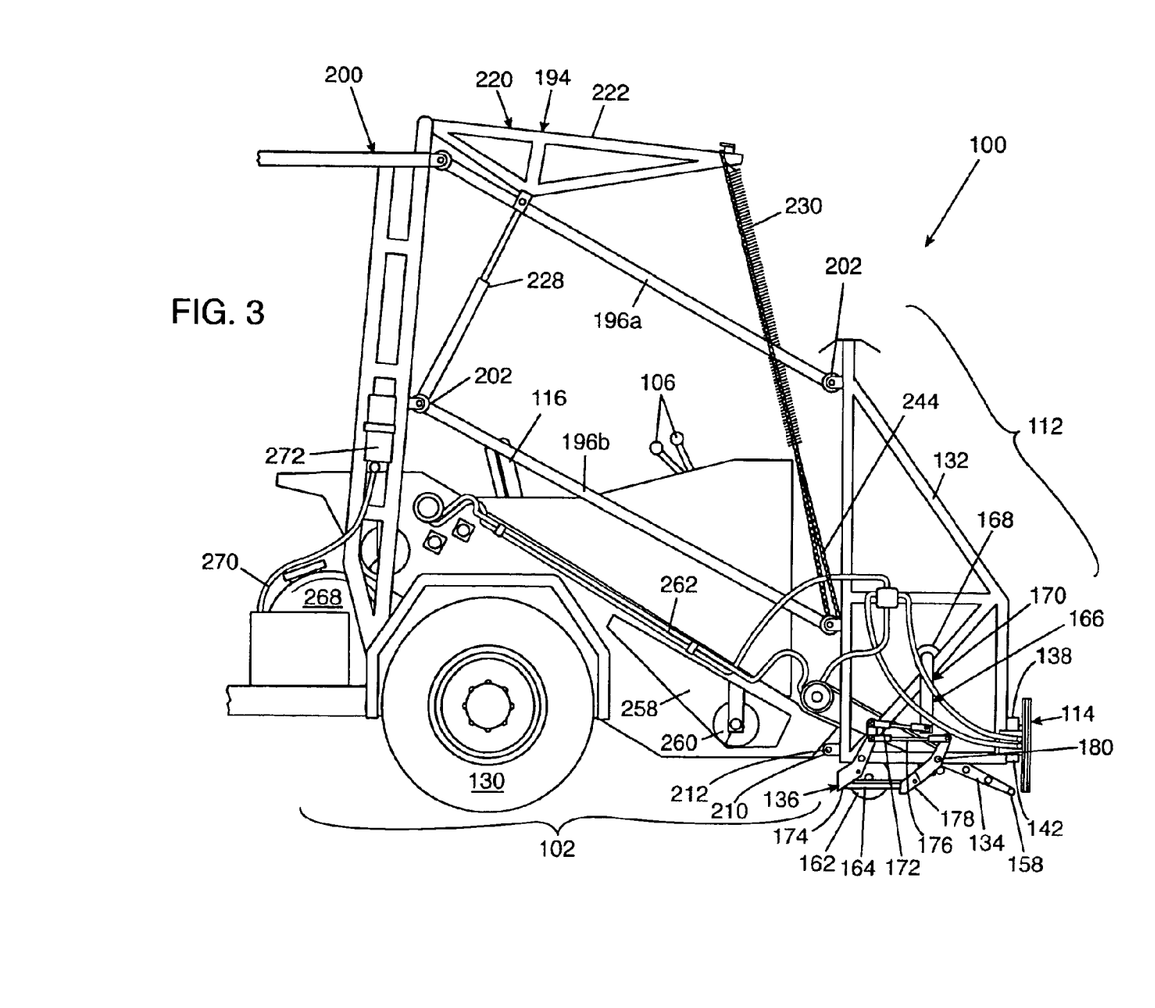
FIG. 3 shows a side view of the front portion of the harvester in greater detail.

FIG. 3 shows a side view of the floating header 112 and the front end of the chassis 102. The floating header 112 comprises a header frame 132 that supports a cutting assembly 114 for cutting the baby greens 110, a collection belt 134 for collecting and moving the cut greens 110 to the sorting belt assembly 108, and a ground contact assembly 136 that contacts the surface of the raised bed 128 so that the floating header 112 can follow the contour of the top surface of the raised bed 128.

A preferred embodiment of the header frame 132 is seen in FIG. 1 in perspective view, and in other figures in side view, however, in alternate embodiments the header frame 132 can be configured in any manner that provides sufficient support for the other components of the floating header 112.

The cutting assembly 114 includes a support beam 138 that holds band saw wheels 140a and 140b on each end, a motor 142 for turning one of the band saw wheels 140a and 140b, and a band saw blade 144 fitted around the two band saw wheels 140a and 140b. The cutting assembly 114 also preferably includes at least one band saw blade sharpening assembly 150, and a band saw tension adjusting means. In the preferred embodiment shown, the support beam 138 is preferably coupled between two front vertical beams of the floating header frame 132. A motor plate 148 is coupled to one end of the support beam 138, and the band saw motor 142 is coupled to the back of the motor plate 148 with the axle of the saw motor 142 extending through an aperture in the motor plate 148 to couple to the first band saw wheel 140a. Any acceptable saw motor 142 may be used, however, hydraulic motors are preferred, and a variety of commercially available hydraulic motors have been found to be acceptable. Actuation of the band saw motor 142 turns the band saw wheel 140a to which it is coupled. The second band saw wheel 140b is coupled to the opposite end of the support beam 138, and includes an axle that turns freely in response to the motion of the band saw blade 144. The embodiment of the cutting assembly 114 using a band saw preferably includes a known tension adjusting means for adjusting the tension of the band saw blade 144, and any practical tensioning apparatus or means may be used.

Figure 4:
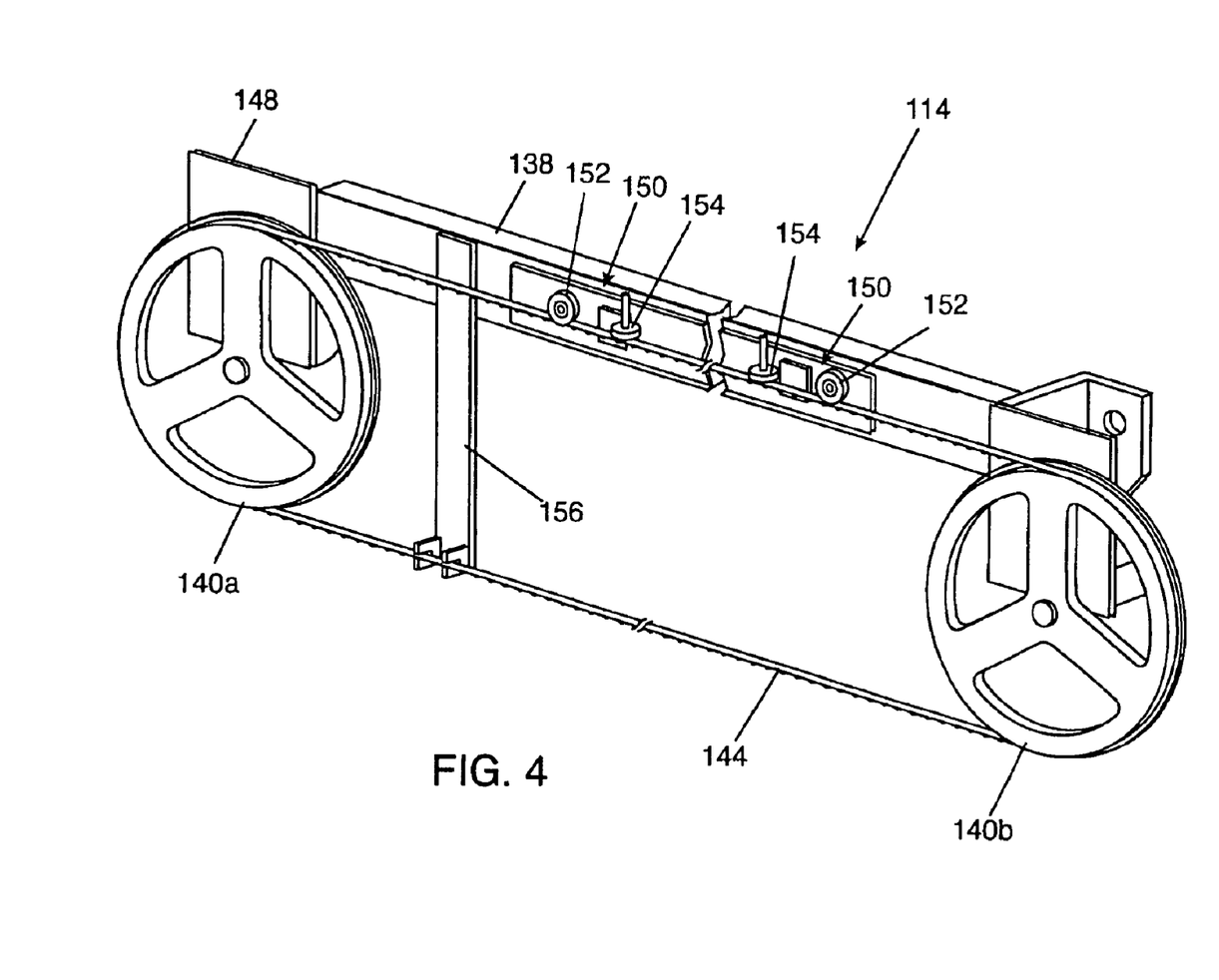
FIG. 4 shows the cutting assembly comprising a band saw.

FIG. 4 shows a front perspective view of the cutting assembly 114 in isolation. The band saw blade 144 is preferably formed of high carbon steel. A number of commercially available band saw blades 144 have been found to be acceptable, however, the band saw blade 144 preferably has a knife cutting edge rather than a toothed cutting edge. The band saw blade 144 is preferably 182 inches to 200 inches long. However, the length of the band saw blade 144 in other embodiments will depend on factors such as the diameter of the band saw wheels 140a and 140b and the span of the floating header 112. In operation the band saw blade 142 preferably travels at a speed between 600 and 1,200 feet per minute. If the speed is too low, the band saw blade 144 will not cut effectively, but if the speed is too high, the motion of the band saw blade 144 will tend to throw the cut baby greens 110 in the direction of travel.

The cutting assembly 114 further preferably includes one or more blade sharpening assemblies 150 intended to keep the band saw blade 144 cutting edge perpetually sharp. One embodiment, shown in FIG. 4, discloses blade sharpening assemblies 150 including a flanged roller 152 that depresses the saw blade 144 downward adjacent to a spring loaded grindstone 154 that engages the cutting edge of the saw blade 144. The flanged rollers 152 are intended to increase stability, and to reduce vibration resulting from the action of the grindstones 154 on the cutting edge of the band saw blade 144. The grindstones 154 can be disks on bearings with rotation driven by the motion of the band saw blade 144, or simple fixed blocks, or any other desired grindstone configuration. The grindstones 154 are preferably spring loaded so that they tend to remain in contact with the cutting edge of the saw blade 144 within a desired selected pressure range. A band saw blade cleaning fork 156 hangs from the support beam 138, and includes tines between which the band saw blade 144 passes, so that materials stuck to the band saw blade 144 may be scraped off as the band saw blade 144 travels between the tines of the cleaning fork 156.

Figure 5:
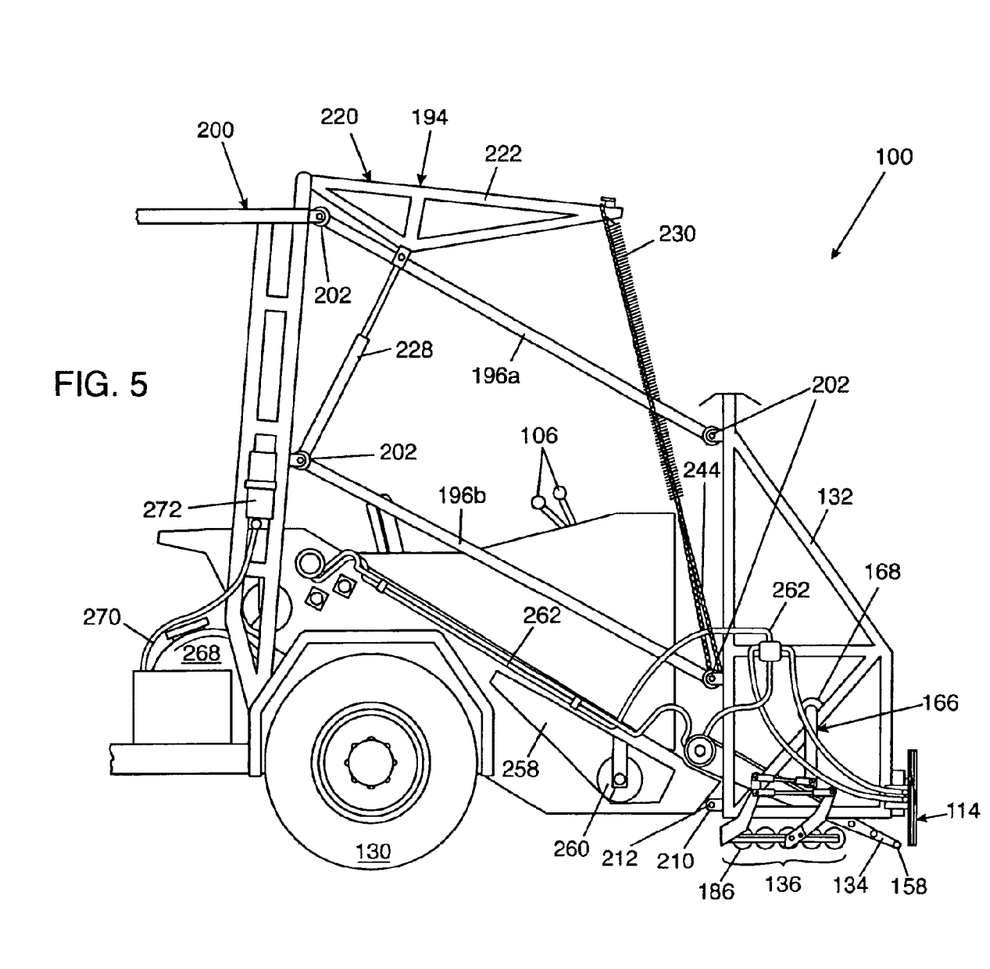
FIG. 5 shows a side view of an alternate embodiment of the floating header incorporating an alternate embodiment of the ground contact assembly comprising a plurality of ground contact rollers.

Referring to FIG. 5, the floating header 112 includes a collection belt 134 fitted over a conveyer belt frame that preferably tapers to a narrow point at the turn or front edge of the collection belt 134. The front edge of the collection belt 134 preferably tapers to a relatively narrow edge to allow the collection belt 134 to fly close to the surface of the raised bed 128 behind the band saw blade 144 so that the cut baby greens 110 will fall onto the upper surface of the collection belt 134. The diameter of the front edge of the collection belt 134 is preferably less than 1.5 inches, and more preferably approximately between ¾ inch and 1 inch. In a preferred embodiment, this is accomplished by using a ¾ inch nose bar 158, and a relatively thin belt material. The nose bar 158 in the embodiment shown does not rotate, and the inner surface of collection belt 134 slides over the motionless nose bar 158. In alternate embodiments the nose bar 158 may rotate to reduce friction between the inner surface of collection belt 134 and the nose bar 158. The collection belt 134 also loops over a drive roller 160 comprising preferably a cylindrical metal core covered by a vulcanized rubber. The vulcanized rubber is preferably smooth, but texture may be useful in alternate embodiments. The power source for the drive roller 160 is preferably a commercially available hydraulic motor, and a variety of such motors have been found acceptable. The collection belt 134 is selected for characteristics, among others, that allow the collection belt 134 to slide over the small diameter nose bar 158. A synthetic monofilament cloth belt is preferred. The collection belt 134 is preferably somewhat wider than the width of the raised beds 128 on which the harvester 100 is intended to be used. In the embodiments discussed herein, the harvester 100 is dimensioned for used on raised beds 128 having an approximate width of 60 to 64 inches, and consequently, the preferred width of the collection belt 134 is belt is preferably approximately 66" wide. In alternate embodiments for use on raised beds 128 of different widths, some dimensions of the harvester 100 would be scaled accordingly, as is well known.

It is often desirable or necessary to adjust the height at which the baby greens 110 are cut above the surface of the raised bed 128 depending on various circumstances including the type and age of the baby greens 110 to be harvested. In the preferred embodiments, the cut height adjustment is accomplished by changing the position of the ground contact assembly 136 relative to the header frame 132. FIG. 5 shows a preferred embodiment wherein the ground contact assembly 136 includes a single ground contact roller 162. The ground contact roller 162 is preferably a single hollow cylindrical steel roller, preferably 60 inches wide and 8 inches in diameter, however other dimensions may be useable.

The ground contact roller 162 is preferably coupled to deployment frame 164 that can be raised or lowered. The ground contact roller 162 may be adjusted downward to increase the cutting height, and adjusted upward to decrease the cutting height. A preferred embodiment of the deployment frame 164 including an actuation assembly 166 for raising and lowering the deployment frame 164 may best be seen in FIGS. 1 and 3. Referring to FIG. 1, a torque tube 168 extends across the header frame 132. Referring to FIG. 3, the actuation assembly 166 is coupled to each end of the torque tube 168 comprising an actuation arm 170 coupled to the torque tube 168 at one end, and to a first lever arm linkage 172 at the other end. The first lever arm linkage 172 is coupled to a first lever arm 174. The first lever arm 174 is coupled by a second lever arm linkage 176 to a second lever arm 178. The ends of the lever arms 174 and 176 opposite the lever arm linkages 172 and 176 are coupled to the deployment frame 164 holding the ground contact roller 162, and the lever arms 174 and 176 are pivotally coupled to the header frame 132 at a lever arm pivot points 180 as seen in FIG. 3. A forward/reverse DC electric motor driving a ball screw, thus allowing fine adjustment, is the preferred power source for turning the torque tube 168, although other motors may be acceptable.

Figure 6:
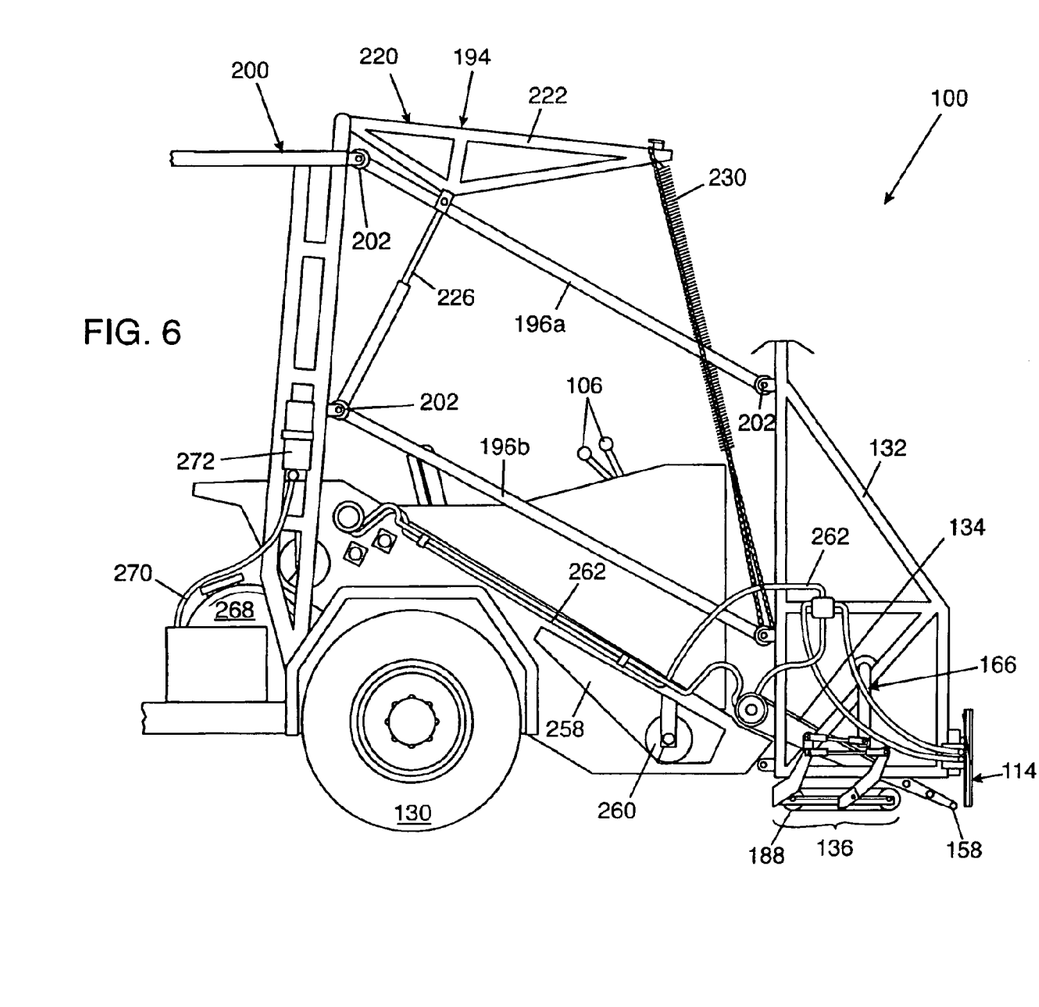
FIG. 6 shows a side view of an alternate embodiment of the floating header incorporating an alternate embodiment of the ground contact assembly comprising a ground contact belt.

The ground contact assembly 136 may be quite different in alternate embodiments. One important consideration is limiting the ground pressure (or pressure per square inch) applied by the ground contact assembly 136. For example, FIG. 5 shows an embodiment in which a plurality of rollers 186 are used. This has the effect of spreading the weight of the floating header 112 over a greater surface area, thus reducing the ground pressure. FIG. 6 shows yet another embodiment of the floating header 112 in which the ground contact assembly 136 comprises a belt 188, looped around two rollers 190, that rides on the surface of the raised bed 128. Another method of reducing the ground pressure applied to the surface of the raised bed 128 by the floating header 112, which will be discussed in more detail further below, includes the use of a lifting arm to transfer some of the weight of the floating header 112 to the chassis 102.

Referring particularly to FIGS. 1 and 3, the connection between the floating header 112 and the chassis 102 of the harvester 100 is articulated so that the floating header 112 can move relative to the chassis 102 in order to follow the top surface of the raised bed 128, independently of the motion of the chassis 102 in the furrows 126 on either side of the raised bed 128. In the preferred embodiment, the floating header 112 is coupled to the chassis 102 of the harvester 100 at seven contact points on the rear of the floating header 112. Two of the contact points are coupled to lift springs 244 of the lift arm assembly 194, the purpose of which will be discussed further below. The remaining five contact points are intended to allow the floating header 112 to move vertically relative to the chassis 102 of the harvester 100, and to rotate or yaw relative to the chassis 102 of the harvester 100 in a plane that is generally perpendicular to the plane of the raised bed 128, but not to allow significant movement side to side or laterally relative to the harvester 100 Chassis 102. Thus, if the height of the raised bed 128 changes relative to the bottom of the furrows 126, or if the furrows 126 on either side of the raised beds 128 are not of the same depth, the floating header 112 may remain level on the raised bed 128 even though the chassis 102 has moved vertically, and or rotated somewhat, relative to the plane of the top surface of the raised bed 128.

Of the five linking points, four are coupled to header liking arms, that extend from the superstructure 200 of the chassis 102 to the back of the floating header frame 132. At least one of the header linking arms, includes a diagonal bar to prevent lateral movement of the floating header 112 relative to the harvester 100 chassis 102. More specifically, three header linking arms 196a, 196b, 196c, are coupled at one end to the chassis 102 superstructure 200 by a coupling that allows the linking arms 196a–c to pivot vertically above the raised bed 128. Any known pivot coupling that allows vertical motion may be used. However, a preferred coupling comprises a pair of flanges 202 extending from either the header frame 132 or the superstructure 200, depending on the end of the linking arm 196a–c being attached. The flanges 202 include apertures that are aligned with a bore in a ball end of one of the linking arms 196a, b, or c. A bolt or pin is passed through the apertures in the flanges 202 and the bore in the ball end of the linking arm 196a, b, or c, so that the arms are coupled as shown in FIG. 1.

The fourth linking arm 198 is best seen in FIG. 1, and is different from the other linking arms 196a–c, by comprising a triangle made up of a main bar 204, that is virtually identical to the linking arms 196a–c, coupled between the super structure of the chassis 102 and the floating header 112, a diagonal bar 206 that extends at an angle from near the end of main bar 204 and couples to the superstructure 200 of the chassis 102 some distance laterally form the main bar 206, and a cross beam 208 that extends between the main bar 204 and the diagonal bar 206 and reinforces the structural integrity of the fourth linking arm. The main bar 204 is preferably coupled to the floating header frame 132 and the harvester 100 chassis 102 using the flanged coupling described above. The diagonal arm 206 is affixed at one end to the main bar 204, and at the other end is coupled to the superstructure 200 of the chassis 102 preferably using the previously describe spherical or ball rod end pivot coupling. Movement of the floating header 112 relative to the chassis 102 is inhibited by the diagonal bar 206 of the fourth linking arm 198, but vertical movement is not affected.

The fifth point of contact with the chassis 102 of the harvester 100 includes a short support arm 210 coupled at the forward end of the base of the sorting belt assembly 108 approximately on the centerline of the harvester 100, and at the other end to a swivel joint 212 on the header frame 132. The swivel joint 212 preferably comprises a ball formed on the end of the support arm 210 and a pair of flanges with opposing apertures on the floating header frame 132. The ball on the end of the support member fits between the flanges and partially within each aperture of each flange. The swivel joint 212 between the header frame 132 and the forward end of the base of the sorting belt assembly 108 allows two things to happen: (1) it allows the floating header 112 to rotate or yaw relative to the chassis 102 approximately around the centerline of the harvester 100, and (2) when the floating header 112 moves vertically, the support arm 210 will pull the forward end of the sorting belt assembly 108 upward, causing the sorting belt assembly 108 to pivot up. The rotational motion is important to allow for furrows 126 that may be of uneven depth on each side of the raised bed 128. Thus if the chassis 102 tips, the floating header 112 can still remain level on the top of the raised bed 128, and it also maintains a preferred spatial relationship between the collection belt of the floating header 112 and the first sorting belt of the sorting belt assembly.

Figure 7:
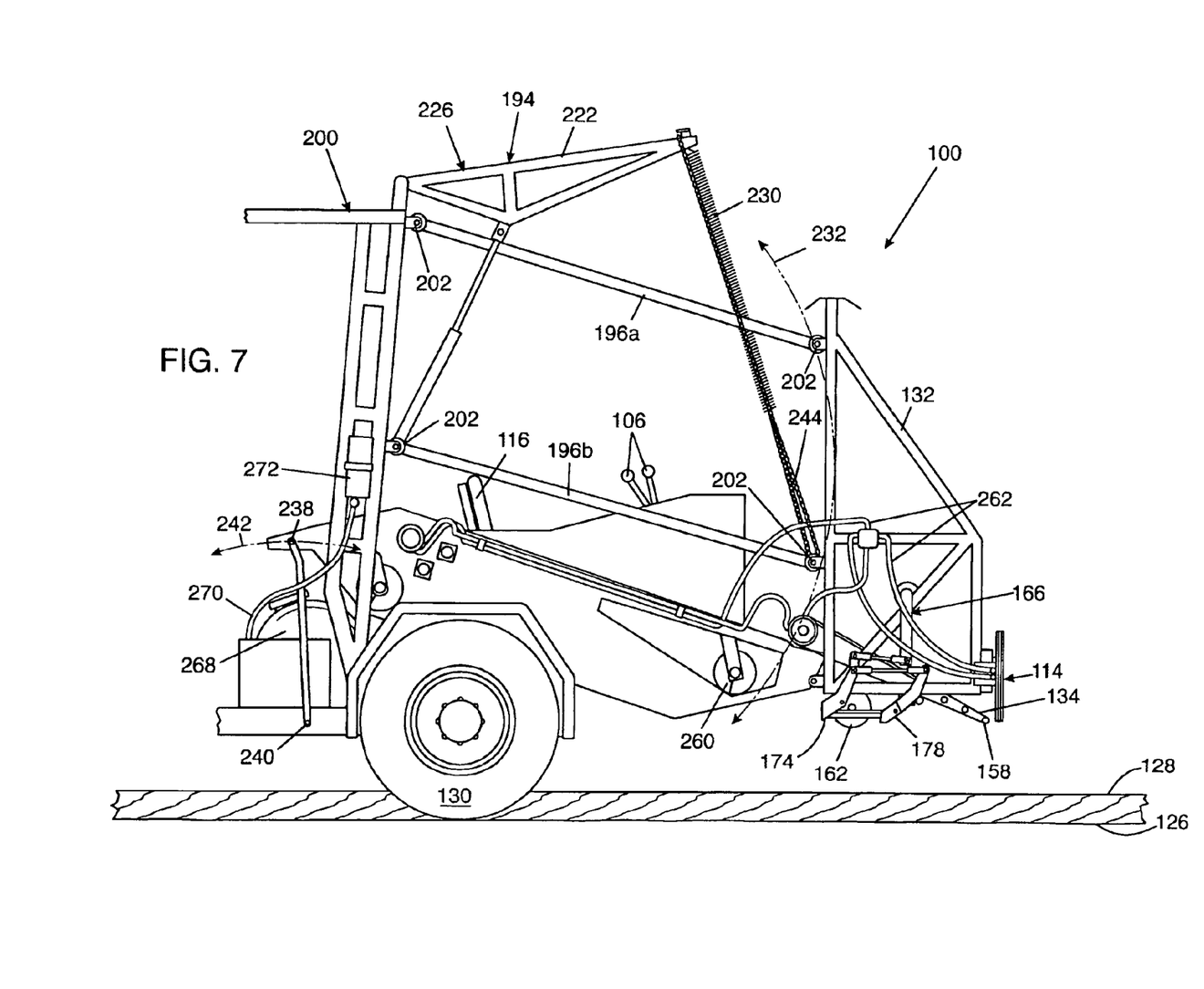
FIG. 7 shows a side view of the harvester with the floating header in a raised position, and highlights the horizontal and vertical arcs of motion of the floating header and sorting belt assembly.

FIG. 7 shows the floating header 112 raised for transport or turning of the harvester 100, with additional detail pertaining to the preferred pivot means used to allow the sorting belt assembly 108 to swing upward. When the floating header 112 rises, the forward end of the sorting belt assembly 108 moves in an arc 232 that creates a motion that includes a forward vector. Thus, the preferred pivot mechanism for the sorting belt assembly 108 allows the forward end of the sorting belt assembly to pivot vertically relative to the chassis 102, and allows the sorting belt assembly 108 to move forward and back relative to the chassis 102 so that the collection belt 134 of the floating header 112 and the sorting belt assembly 108 maintain a relatively fixed spatial relationship as the floating header 112 follows the contours of the top of the raised bed 128. In the preferred embodiment seen in FIG. 7, this is accomplished by the following apparatus. A pivot stand 234 supports the back end of the sorting belt assembly 108 and is coupled to a frame 236 of the sorting belt assembly 102 at a first pivot point 238. This pivot allows the forward end of the sorting belt assembly 108 to pivot upward in the arc designated by the number 232. The opposite end of the pivot stand 234 is pivotally coupled to the chassis 102 at pivot point 240. This pivot allows the sorting belt assembly 108 to move forward and back relative to the chassis 102, as is demonstrated by arc 242. In alternate embodiments, many known variations could be used to provide the same range of motion.

It is important that the ground pressure asserted by the floating header 112 be low enough to avoid damage to the greens 110 growing on the raised bed 128. The invention comprehends a number of methods for adjusting the ground pressure asserted by the floating header 112 including reducing the total weight applied by the floating header 112 to the surface of the raised bed 128, and by increasing the surface area in contact between the ground contact assembly 136 and the top surface of the raised bed 128.

In a preferred embodiment the desired ground pressure is achieved by the use of a lift arm assembly 194, best seen in FIGS. 1 and 3, that partially supports the weight of the floating header 112 and transfers the weight to the chassis 102. In this embodiment, the lift arm assembly 194 comprises a lift arm 220 and lift springs 230. The lift arm 220 comprises a pair of opposing trestles 222 coupled at one end to a cylindrical pivot bar 224 which is further pivotally coupled to the superstructure 200 of the chassis 102, and the other end coupled to a cross beam 226. Each trestle 222 is triangular in shape, and is preferably coupled to a lifting means such as the pair of hydraulic pistons or rams 228 shown. Lift springs 230 hang from the front edge of the lift arm 220 and are coupled to the floating header 112. Tension on the springs 230 is adjusted by movement of the lift arm 220. As the hydraulic rams 228 are extended, the lift arm 220 pivots around the longitudinal axis of the pivot bar 224, causing the opposite ends of the lift arm 220 to swing upward relative to the ground. This increases the tension on lift springs 230, thereby reducing the weight exerted by the floating header 112 on the top of the raised bed 128. The weight is transferred through the lift arm assembly 194 to the chassis 102 of the harvester 100 and to the ground by the tires of the harvester 100 in the furrows 126 between the beds 128. The flexibility of the lift springs 230 allows the maintenance of a selected ground pressure within an acceptable range without significantly interfering with the motion of the floating header 112 as it follows the contours of the surface of the raised bed 128.

In the preferred embodiment using a single ground contact roller 162, it is preferable that the lift arm assembly 194 be adjusted to reduce the weight of the floating header 112 to between 100 and 300 pounds, and more preferably to about 200 pounds. The allowable weight of the header 112 may be greater in embodiments with a larger area of contact between the ground contact assembly 136 and the surface of the raised bed 128. However, In some embodiments, the desired ground pressure may be obtained without the use of a lift arm assembly 194. For example, the alternate embodiment seen in FIG. 5 of the floating header including a ground contact assembly 136 comprising with a plurality of ground contact rollers 186, and the embodiment seen in FIG. 6 which discloses a ground contact assembly 136 comprising a ground contact belt 188, may not require the use of a lift arm assembly. In further alternate embodiments, other known means for reducing the ground pressure exerted by the floating header 112 may be used.

In order to transport the harvester 100, and to make turns at the end of a raised bed 128, it is desirable to be able to easily lift the floating header 112 well clear of the field surface. This is accomplished by the use of one or more chains 244 between the lift arm 220 and the floating header 112 to bypass the lift springs 230. Any useable chain or cable configuration is acceptable for use as chain 244. FIG. 1 shows one configuration that includes a single chain 244 that hangs over the lift arm 220, with the opposing ends of the chain 244 simply coupled to the floating header frame 132 by any acceptable means, such as hooks or the like. Once in place, the lift arm 220 can lift the floating header 112, to a position as seen in FIG. 7. Without the chains 244, the lift springs 230 would simply stretch, and the floating header 112 would not rise. The chain 244 is only coupled to the header frame 132 when lifting the floating header 112 for transport or turning, and not during operation.

Figure 8:
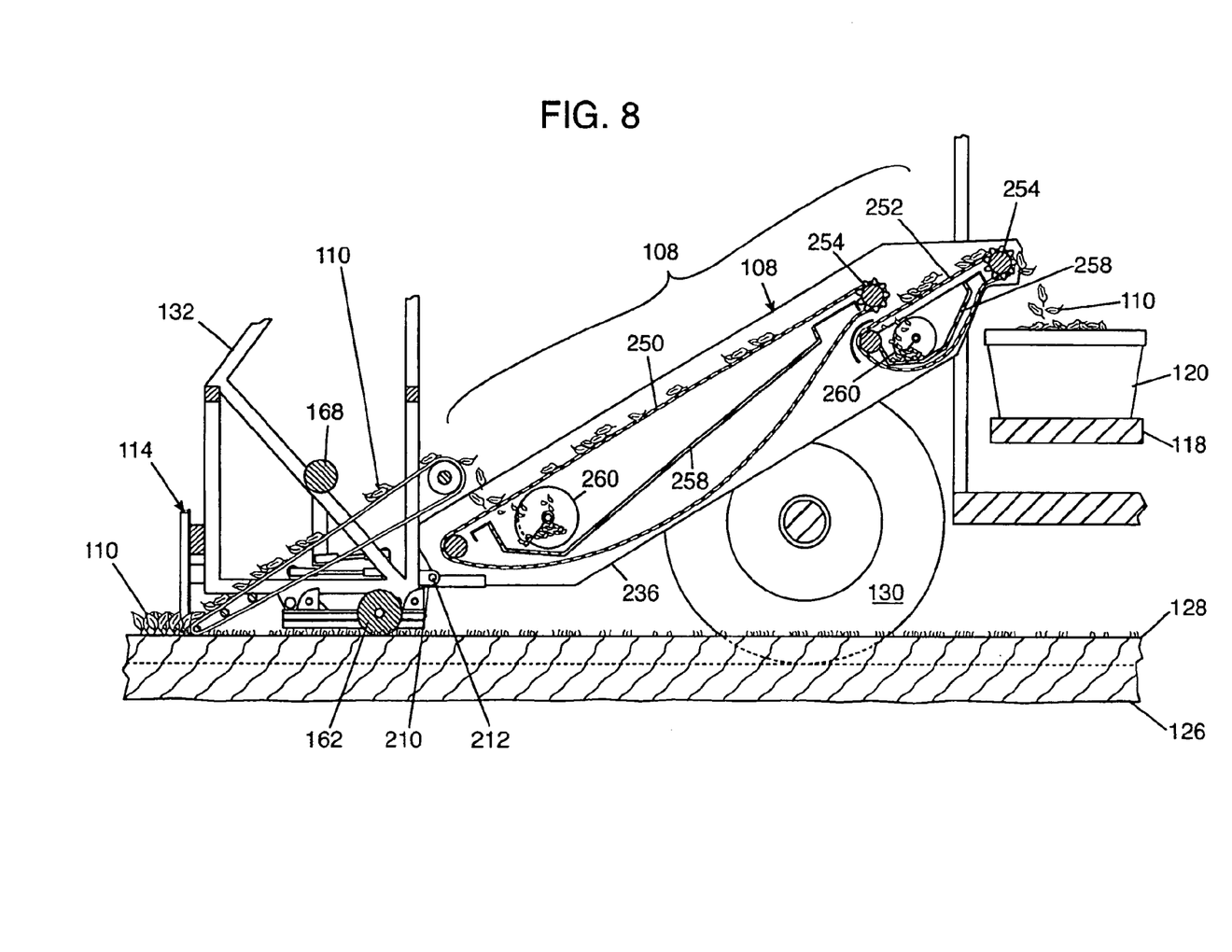
FIG. 8 shows a cut away side view of the front portion of the harvester including the floating header and the sorting belt assembly.

The sorting assembly 108 is intended to sort the cut baby greens 110 at the easiest and most effective time to do so, immediately after the baby greens 110 are cut, while they are only one layer thick, and laying relatively flat on the various sorting belts. After the greens 110 have been transferred to temporary storage containers, such as totes 120, the leaves of the greens 110 tend to clump and it is difficult to separate the leaves for sorting. Known means for doing so may damage the baby greens. Referring to FIG. 8, which shows a side cut away view of the floating header 112 and the forward end of the chassis 102 of the harvester 100, the sorting belt assembly 108 includes at least one sorting belt, and preferably two sorting belts, having a selected mesh size. In the preferred embodiment shown in FIG. 8, a first sorting belt 250, and a second shorter sorting belt 252 are used. The sorting belts 250 and 252 may be formed of virtually any practical material, however, a durable plastic is preferred. The sorting belts 250 and 252 are preferably approximately 64 inches wide. Each of the sorting 250 and 252 belts extends between a pair of toothed rollers 254 powered by hydraulic motors 256, and a variety of commercially available motors have been found to be acceptable. In alternate embodiment, other known motors may be used. An upper belt section is defined as any portion of the belt above the rollers 254, and the lower belt section is defined as any portion of the belt below the rollers 254. A catch basin 258 resides between the upper and lower belt sections of each sorting belt 250 and 252 to catch the material that falls through the sorting belts 250 and 252. The upper belt section of each belt 250 and 252 is kept relatively taught between the rollers 254, but the lower belt section may be slack if desired, but in any case, the lower section of the belts are preferably longer in order to go around the bottom of the catch basins 258 positioned between the upper and lower sections of each sorting belt 252 and 254.

The actual aperture size used in each sorting belt 250 and 252 can be varied depending on a number of considerations including the kind and maturity of crop to be harvested. The size of the apertures is preferably just small enough to retain leaves of the baby greens 110 equal to or larger than a desired minimum leaf size. Currently, the preferred aperture sizes are either 1 inch by 1 inch, or 1.25 inches by 1 inch, depending on the size of the leaves to be harvested. Openings of different sizes or geometry may be used as necessary. The apertures in the second sorting belt 252 may be different for the apertures in the first sorting belt 250, but are generally preferably the same. The drop from the collection belt 134 on the header 112 to the first sorting belt 250 in the sorting belt assembly 108 redistributes the cut baby greens 110 and improves sorting. The drop from the first sorting belt 250 to the second sorting belt 252 further improves sorting by allowing the smaller pieces or waste material a second chance to fall through the mesh into the catch basin 258 of the second sorting belt 252.

Augers 260 are positioned at the low point of each catch basin 258 to continually assist the removal or clearing the collected waste material out of the catch basins 258. The catch basins 258 prevent the waste material from falling onto the bed top 128, and the augers 260 move the collected waste material out of the side of the harvester 100 and into the furrows 126. The augers 260 are preferably plastic in order to reduce weight, although other suitable materials may be used, and are preferably 9 inches in diameter with a 9 inch pitch, however, other geometries may be useable.

The collection belt 134 and the sorting belts 250 and 252 preferably do not all run at the same speed. The collection belt 134 on the floating header 112 preferably runs at a rate selected to provide a good spread of baby greens 110 as the harvester 100 harvests the baby greens 110. The speed of the collection belt 250 will depend on the rate at which baby greens 110 are collected, and the baby greens 110 collection rate will be a function of the density of the crop and the forward speed of the harvester 100. The density of the planting is preferably 0.4 million to 1.5 million live seeds per acre, and more preferably approximately 2.2 million live seeds per acre. The first sorting belt 250 preferably runs at approximately twice the speed of the collection belt 134. This allows the density of the collected baby greens 110 on the belt to be reduced, which assists smaller pieces in falling through the apertures in the sorting belt 250, and makes it easier for workers on the harvester 100 to spot and remove undesired or foreign objects that must be removed by hand. The second sorting belt 252 preferably runs at approximately 150% of the speed of the collection belt 134, which is somewhat slower than the speed of the first sorting belt 250. Consequently, the density of the baby greens 110 are increased somewhat on the second sorting belt 252. As will be discussed further below, some preferred embodiments of the invention wash the greens while they are on the second sorting belt 252, and the increased density allows more efficient water use. The second sorting belt 252 preferably drops the baby greens 110 into totes 120.

The sorting belt assembly 108 is preferably configured with the sorting belts 250 and 252 angled upward to reduce the length of the harvester 100 and to lift the baby greens 110 onto the harvester 100. A steeper angle results in a shorter harvester 100 without shortening the sorting belts 250 and 252, however, the angle of inclination cannot be so steep that the baby greens 110 slide or roll back on the belts 250 and 252. The preferred angle of inclination of the sorting belts 252 and 250 is preferably between 25 and 31 degrees, and more preferably between 28 and 29.5 degrees, during normal operation.

As previously mentioned, some embodiments of the harvester 100 may include a spray bar 266 over the second sorting belt 252. Water from a water tank 268, best seen in FIG. 3, is supplied through hoses 270 to a water pump 272 and from the pump 272 to a plurality of water nozzles 274 coupled to the spray bar 266 extending over the length of the second sorting belt 252. The nozzles 274 preferably spray water continuously on the greens 110 when harvester 100 is in operation. The water cleans the cut baby greens 110, may be beneficial in keeping the greens 110 hydrated, which may increase shelf life.

As previously described, generally a variety of motors are used to drive each belt and the cutting assembly 114. Preferably, separate motors are assigned to each belt, each auger, and to the cutting assembly 114. Virtually any practical motors may be used, however, in a preferred embodiment, hydraulic motors are used to drive each belt and the blade. There are a number of acceptable hydraulic motors available commercially. In embodiments using the hydraulic motors, the motors are preferably linked in series so that the various belts all move in speeds proportional to each other. FIG. 3, shows some of the hydraulic lines 262 connecting several of the various motors. Belt speed is controlled by motor selection. A portion of the power generated by the power source 104 is used to pump hydraulic fluid to the motors controlling the various belts and the cutting assembly 114 saw. The exact speed of the collection belt and the sorting belts 250 and 252 depends on the power source 104 engine RPM, and pump displacement. The harvester's forward speed is preferably independent of the engine RPM. In the preferred embodiment, this is accomplished with the use of an infinitely variable hydrostatic transmission. Thus, the operator controls the speed of the various belts by adjusting the engine RPM, but the forward speed of the harvester is controlled by the hydrostatic transmission, independent of the engine RPM.

Referring to FIG. 2. the second sorting belt drops the cut greens 110 into the totes 120 that are preferably on a conveyor belt 264 that runs perpendicular to the sorting belts 250 and 252. Tote handlers assist the even spread of the baby greens 110 among totes 120 and help the totes 120 along. In alternate embodiments the totes 120 can be handled manually, or another desired container or transport means may be used.

In use, the harvester 100 will preferably have a crew including a driver, at least one tote handler, and at least one inspector to remove undesirable objects from the sorting belts 250 and 252 too large to fall through the apertures of the sorting belts 250 and 252. The driver guides the harvester 100 into the field and positions the wheels of the harvester 100 in furrows 126 on either side of the raised bed 128 to be harvested. The driver's job is to guide the harvester 100 straddling the bed 128 as quickly as possible while still getting a good cut. The inspector removes foreign objects or other materials that should not be harvested, and the tote handlers assist the loading and movement of the totes 120.

As the harvester 100 moves forward, the floating header 112 rides directly on the surface of the raised bed 128, and follows the contours of the raised bed 128, thus maintaining a relatively uniform selected cut height above the surface of the bed 128. The saw blade 144 of the cutting assembly 114 cuts the baby greens 110 cleanly, minimizing the damage to the baby greens 110, thus increasing shelf life. The cut baby greens 110 are urged onto the collecting belt 134 by the density of the plants in the field and the forward momentum of the harvester 100. The collection belt 134 drops the baby greens 110 onto the first sorting belt 250. The drop helps the smaller pieces to fall through the apertures in the sorting belt 250. The first sorting belt 250 drops the baby greens 110 onto the second sorting belt 252. The second drop rearranges the baby greens 110 allowing the small pieces a second chance to fall through. There is also some vibration of the sorting belts 250 and 252 caused by the motion of the harvester 100, and by the motion of the belts 250 and 252 themselves, which further assists the small pieces to fall through the apertures of the sorting belts 250 and 252. The augers 260 rotate to keep the catch basins 258 clear. The second sorting belt 252 drops the baby greens 110 into the totes 120 or other means for collecting the baby greens 110 in a manner for shipping to the warehouse. In preferred embodiments the harvester 100 may include a water tank 268 and nozzles 274 to spray the baby greens 110 as they travels on the second sorting belt 252.

To those skilled in the art, many changes and modifications will be readily apparent from the consideration of the foregoing description of a preferred embodiment without departure from the spirit of the present invention; the scope thereof being more particularly pointed out by the following claims. The description herein and the disclosures hereof are by way of illustration only and should not be construed as limiting the scope of the present invention which is more particularly pointed out by the following claims.

What is claimed is:

1. A method of harvesting leafy green vegetables, the method comprising the steps:
    (a) providing a harvester including a bandsaw cutting blade for cutting vegetables to be harvested, said harvester further including a collection belt positioned behind said cutting blade,
    (b) providing a field planted with a selected crop density;
    (c) using said crop density and a forward momentum of said harvester to assist the cut greens to be collected onto said collection belt.

2. The method of claim 1, wherein the crop density ranges between 10 and 25 seed lines per linear foot.

3. The method of claim 1, wherein the crop density is 14 seed lines per linear foot.

4. The method of claim 1, wherein said collection belt of said harvester includes a nose end positioned behind said cutting blade, and wherein said nose end comprises a forward turn less than one inch in diameter.

5. The method of claim 1 wherein said band saw blade and said collection belt are positioned on a floating header that is configured to move independently of a chassis of the harvester to follow contours of a top of a raised bed.

6. A harvester comprising:
    a chassis including a central axis extending from a front of said chassis to a back of said chassis,
    a floating header including a cutting assembly and a ground contact assembly, wherein said ground contact assembly rides on a top surface of a raised bed and at least partially supports a weight of said floating header,
    a coupling assembly between said chassis and said floating header configured to allow said floating header to move vertically relative to said chassis, and to rotate in a plane approximately perpendicular to said axis of said chassis, and
    a suspension system coupled between said chassis and said floating header for reducing ground pressure applied by said ground contact assembly.

7. The harvester of claim 6, wherein said cuffing assembly comprises a bandsaw cutting blade.

8. The harvester of claim 7, wherein said cutting assembly further comprises a collection belt positioned behind said cuffing blade.

9. A method of using the harvester of claim 8 comprising the steps:
    (a) providing a field planted with a selected crop density;
    (b) using said crop density and a forward momentum of said harvester to assist the greens cut by said band saw blade to be collected onto said collection belt.

10. The method of using the harvester of claim 9, wherein the crop density ranges between 10 and 25 seed lines per linear foot.

11. The method of using the harvester of claim 9, wherein the crop density is 14 seed lines per linear foot.

12. The method of using the harvester of claim 9, wherein said collection belt of said harvester includes a nose end positioned behind said cutting blade, and wherein said nose end comprises a forward turn less than one inch in diameter.

13. A harvester comprising:
    a chassis including a central axis extending from a front of said chassis to a back of said chassis,
    a floating header including a cutting assembly, said cutting assembly comprising a band saw blade, said floating header further comprising a ground contact assembly, wherein said ground contact assembly rides on the top surface of the raised bed and at least partially supports a weight of said floating header,
    a coupling assembly between said chassis and said floating header configured to allow said floating header to move vertically relative to said chassis, and to rotate in a plane approximately perpendicular to said axis of said chassis.

14. The harvester of claim 13, further comprising a suspension system coupled between said chassis and said floating header for reducing ground pressure applied by said ground contact assembly.

15. The apparatus of claim 13, wherein said cutting assembly further comprises a collection belt positioned behind said cutting blade.

16. The method of claim 13, wherein said collection belt of said harvester includes a nose end positioned behind said cutting blade, and wherein said nose end comprises a forward turn less than one inch in diameter.

17. A method of using the harvester of claim 15 comprising the steps:
    (a) providing a field planted with a selected crop density;
    (b) using said crop density and a forward momentum of said harvester to assist the greens cut by said band saw blade to be collected onto said collection belt.

18. The method of using the harvester of claim 17, wherein the crop density ranges between 10 and 25 seed lines per linear foot.

19. The method of using the harvester of claim 17, wherein the crop density is 14 seed lines per linear foot.

* * * * *